United States Patent
Bedi et al.

(10) Patent No.: US 7,293,011 B1
(45) Date of Patent: Nov. 6, 2007

(54) TQ DISTRIBUTION THAT INCREASES PARALLISM BY DISTRIBUTING ONE SLAVE TO A PARTICULAR DATA BLOCK

(75) Inventors: Harmeek Bedi, Foster City, CA (US); Ashish Thusoo, Foster City, CA (US); Thierry Cruanes, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 713 days.

(21) Appl. No.: 10/305,744

(22) Filed: Nov. 27, 2002

(51) Int. Cl.
*G06F 17/30* (2006.01)

(52) U.S. Cl. .................. 707/2; 707/8; 707/10; 718/100

(58) Field of Classification Search .................... 707/2, 707/8, 10; 718/100
See application file for complete search history.

(56) References Cited

U.S. PATENT DOCUMENTS

| | | |
|---|---|---|
| 4,769,772 A | 9/1988 | Dwyer |
| 4,829,427 A | 5/1989 | Green |
| 5,091,852 A | 2/1992 | Tsuchida et al. |
| 5,325,525 A | 6/1994 | Shan et al. |
| 5,339,429 A | 8/1994 | Tanaka et al. |
| 5,452,468 A | 9/1995 | Peterson |
| 5,495,419 A | 2/1996 | Rostoker et al. |
| 5,495,606 A | 2/1996 | Borden et al. |
| 5,537,588 A | 7/1996 | Engelmann et al. |
| 5,551,027 A | 8/1996 | Choy et al. |
| 5,574,900 A | 11/1996 | Huang et al. |
| 5,590,319 A | 12/1996 | Cohen et al. |
| 5,642,515 A | 6/1997 | Jones et al. |
| 5,675,791 A | 10/1997 | Bhide et al. ................. 395/621 |
| 5,680,547 A | 10/1997 | Chang |
| 5,710,915 A | 1/1998 | McElhiney |
| 5,787,251 A | 7/1998 | Hamilton et al. |
| 5,857,180 A | 1/1999 | Hallmark et al. |
| 5,918,225 A | 6/1999 | White et al. |
| 6,009,265 A | 12/1999 | Huang et al. ................. 395/600 |
| 6,289,334 B1* | 9/2001 | Reiner et al. ................... 707/3 |
| 6,430,550 B1 | 8/2002 | Leo et al. |
| 6,438,558 B1 | 8/2002 | Stegelmann ................ 707/102 |
| 6,438,562 B1 | 8/2002 | Gupta et al. |
| 6,684,203 B1 | 1/2004 | Waddington et al. .......... 707/3 |
| 6,901,405 B1 | 5/2005 | McCrady et al. |

(Continued)

OTHER PUBLICATIONS

Leverenz et al., "Oracle8i Concepts Release 8.1.5", Feb. 1999, Copyright 1999 Oracle Corporation, pp. 1-121, <http://www.csee.umbc.edu/help/oracle8/server.815/a67781/toc.htm>.*

(Continued)

*Primary Examiner*—Hung Q Pham
(74) *Attorney, Agent, or Firm*—Hickman Palermo Truong & Becker LLP (57) ABSTRACT

Provided herein are techniques that may be used to dramatically increase parallism for distributed DML operations. The work of distributed DML operations are distributed in a way that avoids self-dead locks, by ensuring that, for a given data block, no more than one slave is assigned to modify a row that is wholly contained by the data block or whose head row piece is contained by the data block. Assigning slaves in this way not only allows more slaves to be assigned to modify a partition, but allows for greater flexibility in load balancing.

20 Claims, 7 Drawing Sheets

U.S. PATENT DOCUMENTS

| | | |
|---|---|---|
| 6,941,360 B1 | 9/2005 | Srivastava et al. .......... 709/223 |
| 6,954,776 B1 | 10/2005 | Cruanes et al. |
| 6,961,729 B1 | 11/2005 | Toohey et al. |
| 6,980,988 B1 | 12/2005 | Demers et al. |
| 6,990,503 B1 | 1/2006 | Luo et al. ................... 707/200 |
| 2002/0038313 A1 | 3/2002 | Klein et al. |
| 2002/0138376 A1 | 9/2002 | Hinkle |
| 2005/0283471 A1 | 12/2005 | Ahmed |
| 2006/0041537 A1 | 2/2006 | Ahmed |

OTHER PUBLICATIONS

Bergsten, et al., Prototyping DBS3 a Shared-Memory Parallel Database System, IEEE, 226-234, 1991.

Hirano, et al., Load Balancing Algorithm for Parallel Processing on Shared Memory Multiprocessor, IEEE, pp. 210-217, 1991.

Hong, et al., Optimization of Parallel Query Execution Plans in XPRS, Proceedings of the First International Conference on Parallel and Distributed Information Systems, IEEE, 1991, pp. 218-225.

"An Analysis of Three Transaction Processing Architectures," Anupam Bhide, Computer Science Division, UC Berkeley, 1998, pp. 339-350.

"A Benchmark of NonStop SQL Release 2 Demonstrating Near-Linear Speedup and Scaleup on Large Databases," Susan Englert, et al., Technical Report 89.4, May 1989, pp. 1-23.

"A Benchmark of NonStop SQL on the Debit Credit Transaction," The Tandem Performance Group, 1988, pp. 337-341.

"Data Placement in Bubba," George Copeland, et al., MCC, 1988, pp. 99-108.

"The Design of XPRS," Michael Stonebraker, et al., EECS Department UC Berkeley, 1988, pp. 318-330.

"A Performance Analysis of the Gamma Database Machine," DeWitt, et al., Computer Sciences Department, University of Wisconsin, 1988, pp. 350-360.

Goetz Graefe, "Encapsulation of Parallelism in the Volcano Query Processing System," Mar. 1990, pp. 102-111.

German Patent Office, "Office Action," GR App. No. P4479320.9-53, dated Dec. 22, 2005 (5 pages), with English translation (4 pages).

Borla-Salamet, Pascale, "Compiling Control into Database Queries for Parallel Execution Management;" IEEE Conference on Parallel Distributed Information Systems, 1991, ISBN 0-8186-2295-4, pp. 271-279.

\* cited by examiner

TQ DISTRIBUTION THAT INCREASES PARALLISM BY DISTRIBUTING ONE SLAVE TO A PARTICULAR DATA BLOCK

FIELD OF THE INVENTION

The present invention relates to performing database tasks in parallel using multiple processes, and in particular, to performing in parallel parent tasks that involve DML operations.

BACKGROUND OF THE INVENTION

In typical database systems, users write, update and retrieve information by submitting statements to a database application. To be correctly processed, the commands must comply with the database language that is supported by the database application. One popular database language is known as Structured Query Language ("SQL").

Operations that modify data stored in a database are referred to as DML ("data manipulation language") operations. DML operations include inserting a row, updating a row, and deleting a row. The subset of SQL commands that specify DML operations are referred to as DML commands. Examples of DML commands in SQL include Insert, Update, Upsert, and Delete.

Many database systems are multi-processing systems. Multi-processing systems are typically partitioned into nodes, where each node may contain multiple processors executing multiple concurrent processes. To fully utilize the computing power of a multi-processing system, a database system may divide a large processing task ("parent task") into smaller subtasks, which may then be distributed to multiple processes running on one or more processing nodes. Because the subtasks are being performed in parallel, the processing required by the parent task can be completed much faster than if the processing is performed by a single process.

A parent task that is divided into smaller subtasks that are executed by multiple processes is referred to herein as a distributed operation. The number of processes that are assigned to perform a distributed operation is referred to as the degree of parallelism. In general, a task may be performed more efficiently by increasing the degree of parallelism, at least up to a particular threshold.

At least part of a parent task is divided in smaller subtasks during a process referred to as execution planning. When a database server receives a request to execute a database statement, the database server generates an execution plan and then executes the plan. The process of generating the execution plan is also referred to as the execution planning phase. Execution planning may include creating subtasks for executing the database statement and assigning processes to execute a portion of the execution plan.

Unfortunately, the degree of parallelism that may be achieved for a distributed DML operation is limited. A reason for this limitation is that a distributed DML operation must be divided and assigned to processes in a way that avoids undue contention for locks and other resources used to manage concurrent access to units of storage in which data is stored, as shall be explained in greater detail below.

Storage of Database Data

In a relational database system, data is stored in rows of logical data containers referred to as tables, each table having one or more columns, each row in the table having a value stored for each of the columns. The present invention is, however, not limited to relational database systems. However, for the purpose of explanation, the examples and the terminology used herein shall be that typically associated with relational databases, where the terms "table", "row" and "column" shall be used herein to refer respectively to the data container, record, and field. In object oriented databases, the logical data containers are referred to as object classes, the records are referred to as objects, and the fields are referred to as attributes. Other database architectures may use other terminology.

Databases use various types of logical storage units to store rows of a table, each type corresponding to a level of granularity. Typically, the logical storage unit at the lowest level of granularity is a data block. In database systems that support table partitioning, a logical storage unit at a higher level of granularity than a data block is a "table partition".

In table partitioning, a database table is divided into sub-tables, which are referred to as table partitions. The most common form of partitioning is referred to as range partitioning. With range partitioning, each individual partition corresponds to a particular range of values for one or more columns of the table. All rows that have values that fall into the range associated with a partition are entirely contained within that partition.

Conventional Parallel Processing of Partitioned Tables

Many database systems impose restrictions on how a distributed DML operation may be divided into subtasks and distributed to processes. In fact, a task involving DML operations to a non-partitioned table cannot be performed as a distributed operation. For partitioned tables, some database systems are able to execute distributed DML operations if they conform to the one-slave-per-partition restriction. This restriction requires that only one slave participating in the execution of a distributed DML operation may perform DML operations to the partition. To comply with this restriction, during the execution planning phase, a database system divides a DML operation into subtasks that involve modifying data in only one partition and assigns the subtasks to modify a particular partition to only one slave. Assigning processes in this way before execution of the distributed DML operation is referred to herein as static binding. The one-slave-per-partition restriction and static binding cause several problems.

First, the one-slave-per-partition restriction limits the degree of parallism that may be achieved for DML operations to the number of partitions in a table. For example, if a table has two partitions, no more than two processes may be assigned to execute a distributed DML operation.

Second, static binding subjects execution of a distributed operation to inefficiencies caused by data skewing. The term data skewing refers to a condition in which the operations of a DML operation involving multiple partitions concentrate on a subset of the partitions—an occurrence which is frequent. When a distributed operation is affected by data skewing in this way, the processes assigned to the partitions in which the DML operations are concentrated perform most of the work, and are likely working while other slaves assigned to the other partitions lay idle. This wastes resources, creates inefficiency, and deprives a database system from realizing the full potential of parallel processing. In fact, a distributed operation affected by data skewing may be performed less efficiently than performing the operation using one process.

Distributed Transactions

A database system executes a distributed DML operation as a distributed transaction. A distributed transaction is composed of multiple transactions referred to as subtransactions, each is executed by a process participating in a distributed transaction. Such processes are referred to herein as slaves with the respect to a particular distributed transaction. Each slave may be assigned to execute one or more subtasks. The slaves may reside on the same or different nodes of a computer system. The subtasks assigned to a slave for execution by the slave are executed as part of the slave's subtransaction. All subtransactions of a distributed transaction are committed, or none are committed and the distributed transaction is aborted.

To limit the number of processes contending for a data block, each data block contains a threshold number of interested-transaction-locks. An interested transaction is an unterminated transaction that includes modifications to a data block. An interested-transaction-lock must by acquired by the process executing an interested transaction before the transaction can be committed. If an interested-transaction-lock cannot be acquired by the process, the process may later attempt to acquire the interested-transaction-lock, or abort the transaction.

The fallout of the failure to acquire an interested-transaction-lock for a subtransaction is not limited to aborting the subtransaction. Rather, the entire distributed transaction of the subtransaction may have to be aborted, because all subtransactions of the distributed transaction must be committed or none at all.

If a distributed transaction is distributed to slaves in such a way that the number slaves affecting a data block is greater than the threshold number of interested-transaction-locks, not all slaves that need an interested-transaction-lock for the block can obtain an interested-transaction-lock, making it impossible to commit the distributed transaction. Because it is not possible to commit the distributed transaction, the distributed transaction is inherently "self-deadlocked".

The one-slave-per-partition restriction prevents self-deadlocks. Because under this restriction only one slave is assigned to change a data block within a partition, the total number of interested-transaction-locks that are held for a subtransaction of a distributed transaction is not greater than one, at least for some database systems.

The one-slave-per-partition restriction appears to be overly restrictive. Data blocks in a partition can have up to a threshold number of interested-transaction-locks. Rather than assigning just one slave to modify data in partition, it is possible to assign a number of slaves such that the number is no greater than the threshold number of interested-transaction-locks, ensuring that there is at least one interested-transaction-lock for each slave accessing a data block in a partition. However, the degree of parallism is still limited by the number interested-transaction-locks in a data block. Furthermore, this approach can lead to self-deadlocks because of the way rows may be stored in data blocks in some database systems.

Specifically, a database system may store a row in more than one data block. A row that is stored in more than one data block is referred to herein as a spanning row. A spanning row consists of row pieces; one of the row pieces resides in the data blocks "spanned" by a spanning row. The first row piece is referred to as the head row piece. The one or more other row pieces of the spanning row are referred to as overflow row pieces.

When a slave changes (or inserts) a row, the slave must first acquire an interested-transaction-lock on the row's data block. If the row is a spanning row, the slave may have to access an overflow row piece, which resides in another data block. To access the other data block and insert or update an overflow row piece, the slave must also acquire an interested-transaction-lock for the overflow row piece. Under the approach where the number of slaves is limited to a threshold number of interested-transaction-locks, it is possible that the threshold number of interested-transaction-locks have been assigned for the other block. Thus, when the slave attempts to acquire an interested-transaction-lock, there is none available, creating a self-deadlock situation.

Contention for Free Lists

In addition to contention for interested-transaction-locks, contention for other types data structures used for managing access to partitions can lead to inefficiencies. An example of such a data structure is a free list. A slave (or other type of process) executing a DML operation to insert a row needs to identify a "free" data block that has room to insert another row. For this purpose, a database system maintains a group of free lists ("free list group") for a partition that list data blocks with "free space" sufficient for insertion of a row. These lists are updated as processes insert, delete, or update a row.

Before a slave inserts a row, it selects a free list and reads it to identify a free data block. If after inserting the row the free space in the data block is insufficient for another row, the free list is modified to remove the data block from the free list.

When a slave deletes a row from a data block that is not free, free space may be created for another row. In this case, the slave selects a free list and modifies it to add the freed data block to the free list.

When a slave updates a row in a data block, the row's size may increase or decrease, causing the free space in the data block to decrease or increase. A decrease of free space in the data block can possibly cause removal of the data block from a free list. Likewise, an increase in the free space of a data block can possibly cause the addition of the data block to a free list. Finally, updates to a row which increase the row size may cause the row to be inserted into a new block, which of course affects that block's free space and the block's inclusion in a free list.

Whenever a slave accesses a free list in a free list group to identify and possibly remove a data block or add a data block to the free list, the slave first exclusively locks the free list to prevent other slaves from accessing and modifying the free list. While the free list is locked by the slave, other slaves needing access to a free list in the free list group select a free list in the group that is not locked. If there are more slaves performing DML operations on a partition then there are free lists in the free list group, it is possible that more slaves may concurrently require access to a free list in a free list group than there are free lists available in the group. The slaves whose access to a free list in a free list group is blocked because all free lists in the group are locked wait and remain idle until a slave unlocks a free list. In general, a distributed transaction is performed less efficiently by a group of slaves the more any of them lay idle while the other slaves work.

Based on the foregoing, it is clearly desirable to provide an approach that allows a degree of parallism for a partition that is not limited to the number of slaves or subtransactions, within a distributed transaction, that can concurrently affect a single data block while also minimizing contention for interested-transaction locks and other data structures that govern access to data blocks and other types of logical storage units.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus is described for performing DML database tasks in parallel using multiple processes. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

Provided herein are techniques that may be used to dramatically increase parallism for distributed DML operations. The work of distributed DML operations are distributed in a way that avoids self-dead locks, by ensuring that, for a given data block, no more than one slave is assigned to modify a row that is wholly contained by the data block or whose head row piece is contained by the data block. Assigning slaves in this way not only allows more slaves to be assigned to modify a partition, but allows for greater flexibility in load balancing.

In addition, the work of modifying partitions is distributed in a way that reduces or eliminates contention for free lists. Scalability is improved because a greater number of slaves may be used to modify data stored in partitions without increasing contention for the free lists.

Database System

Figure 1:
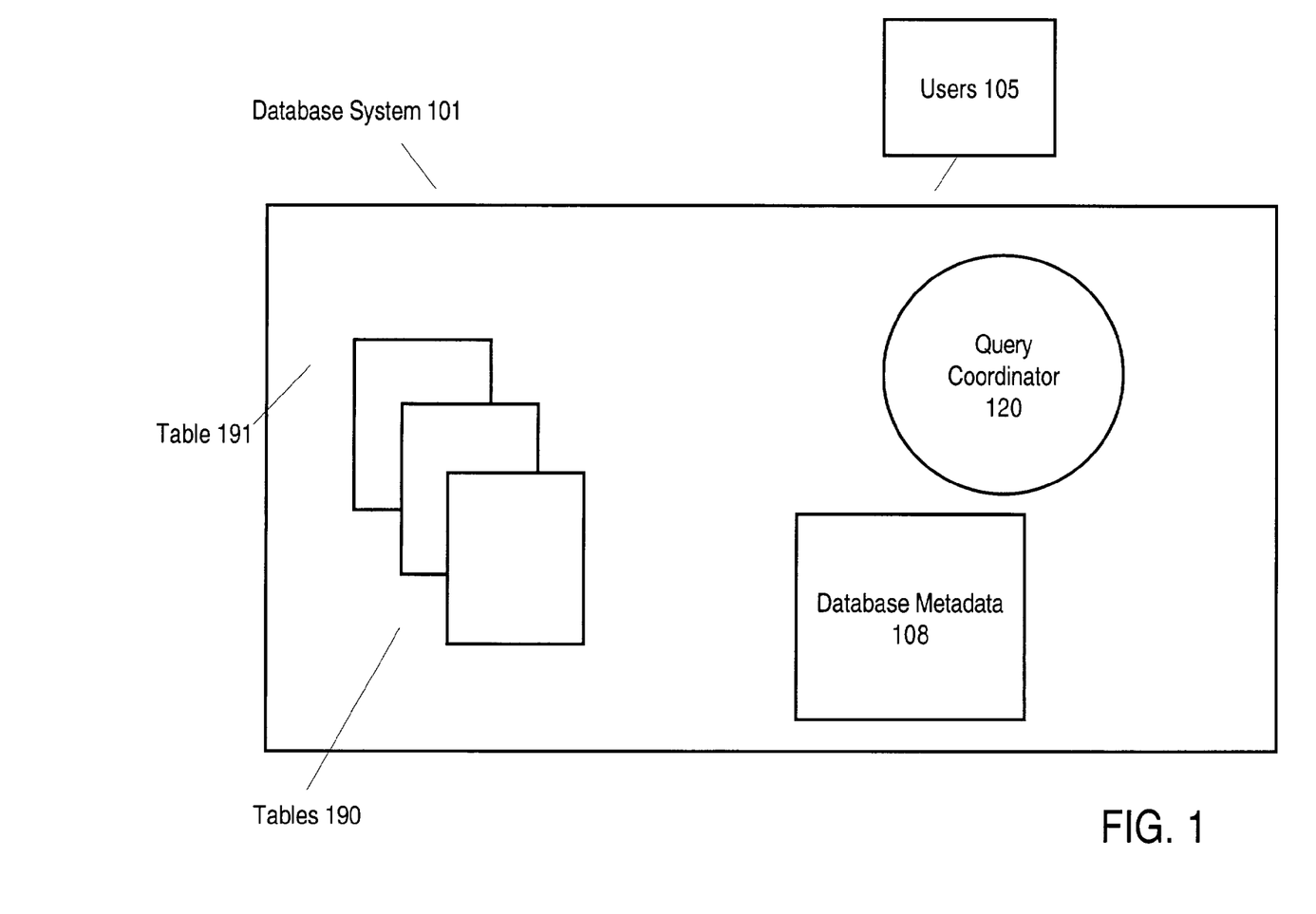
FIG. 1 is a block diagram depicting a database system that may be used to implement an embodiment of the present invention.

FIG. 1 is a block diagram that provides an overview of a database system configured to process DML operations according to the techniques described herein. The techniques are not limited to processing any particular type of DML operation. Multi-processing database system 101 manages and stores data for users 105. Users 105 may include individual users, or collections of individuals or computers.

Database system 101 stores and manages data using a variety of database objects. Database objects include tables, such as tables 190, database metadata, such as database metadata 108, indexes, and code modules. Tables 190 include table 191. Database metadata 108 is metadata that describes the configuration of a database system. Database metadata 108 defines, for example, database objects such as tables, indexes for tables. Database metadata 108 is generated, at least in part, in response to receiving data definition commands from a user. Query coordinator process 120 is responsible dividing a DML operation requested by a database statement into subtasks and assigning groups of slaves to execute the those subtasks. The operations of the coordinator process shall be described in greater detail later.

Data Blocks, Row Pieces, Interested-Transaction-Locks

Figure 2:
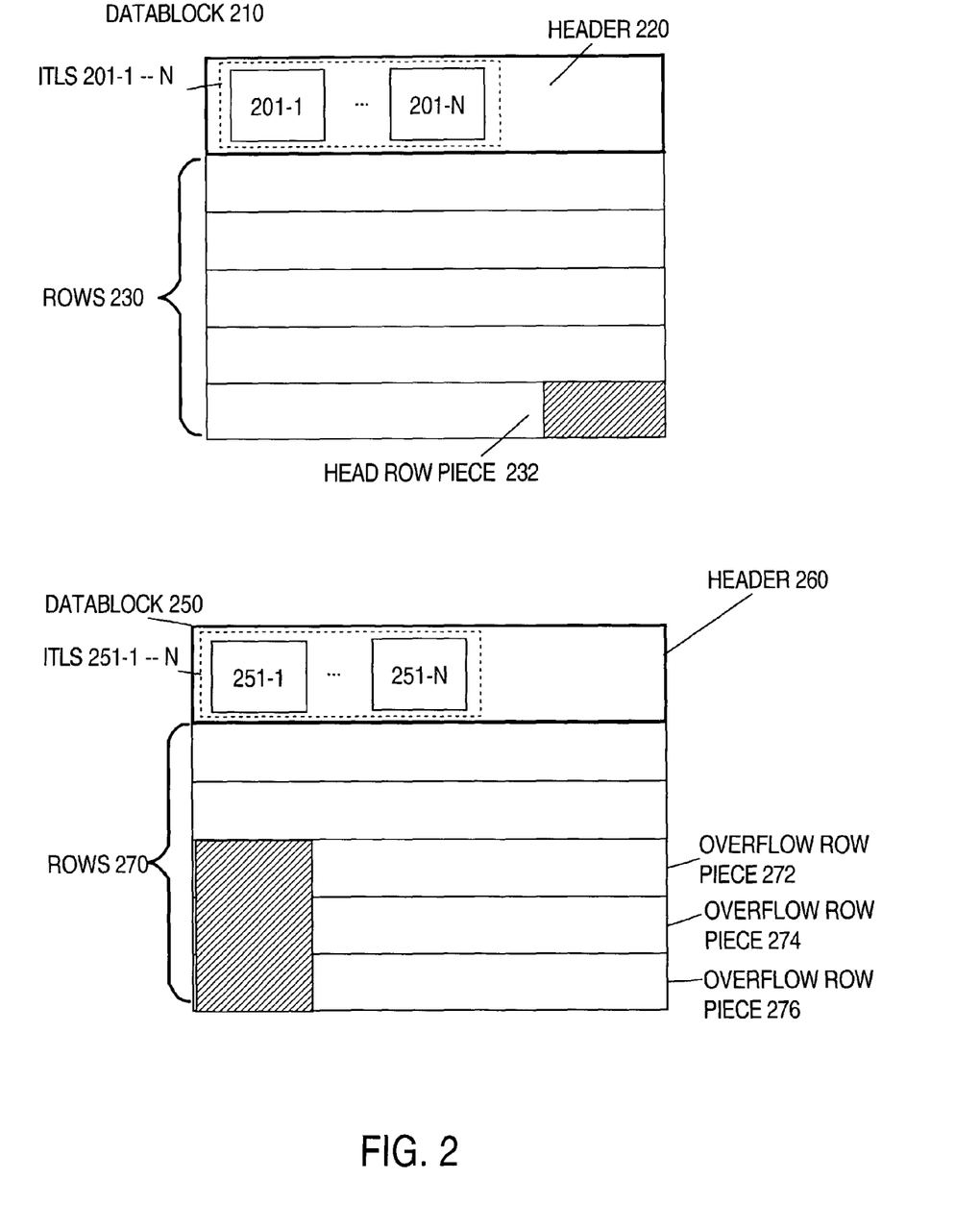
FIG. 2 is a block diagram of data blocks according to an embodiment of the present invention.

FIG. 2 is a block diagram depicting data blocks 210 and 250. Data blocks 210 and 250 are used to store data for table 191. Data block 210 includes rows 230 and header 220. A header in a data block, such as header 220, contains data used to manage the data block. Header 220 contains information such as the size of the data block (e.g. how many bytes), how many rows it contains, the size of the header portion, and a transaction list. Header 220 also includes N interested-transaction-locks 201-1 through 201-N.

Similarly to data block 210, data block 250 contains rows 270, header 260, and M interested-transaction-locks 201-1 through 201-N. M and N are not necessarily equal.

Rows in table 191 contain a row-id that uniquely identifies the row among those in table 191 as well as other tables that are maintained by database system 101. The row-id contains information that identifies the data block that contains the row, and in the case of the spanning row, the head row piece of the row.

A data block is said to contain a row if it contains the row in whole or a row piece of the row. Data block 210 contains head row piece 232. Data block 250 contains three overflow row pieces: overflow row piece 272, overflow row piece 274, and overflow row piece 276. Overflow row piece 272 and head row piece 232 compose the same spanning row. Overflow row piece 274 and overflow row piece 276 are part of spanning rows with other overflow row pieces and head row pieces not shown. In database system 101, two or more row pieces may compose a spanning row.

Row control data indicates whether a row piece is a head piece or an overflow piece, and what data block holds a subsequent row piece. Row control data may be stored in a row or elsewhere within a data block. A data block that contains a non-spanning row or the head row piece is referred to as the primary data block for the row. The primary data block of the row may be determined by examining its row-id.

As mentioned before, a slave executing a subtransaction must first acquire an interested-transaction-lock in a data block before modifying a row in the data block. If the row is a spanning row, the slave then accesses a subsequent overflow row piece in the another data block identified by row control data for the head row piece. Again, the slave must first acquire an interested-transaction-lock in the other data block before the slave can access the overflow row piece in the data block.

When a slave accesses a data block to change a non-spanning row or the head row piece of a row, the slave is referred to as a primary slave for the data block. Thus, when a slave is accessing a row in the data block identified by the row's row-id, the slave is accessing either a non-spanning row or the head row piece, and is a primary slave with respect to the data block. When a slave accesses a data block to access an overflow row piece, it is referred to as a secondary slave with respect to the data block.

Data blocks within table 291 are maintained by database system 101 so that they contain a threshold minimum number of interested-transaction-locks. The threshold number is the number of overflow pieces contained in the data block plus 1. Thus, for data block 250, the threshold number is 1+3 (for three overflow pieces), which is 4. For data block 210, the threshold number is 1+0 (for zero overflow pieces).

Maintaining the threshold number in this way prevents a distributed transaction from self-dead locking so long as one primary slave participating in the distributed transaction can be assigned to a data block. The threshold minimum ensures the availability of one interested-transaction-lock for a primary slave of a data block, and one interested-transaction-lock for each secondary slave that can access an overflow piece in the data block.

Distributing for One Primary Slave Per Data Block

Figure 3:
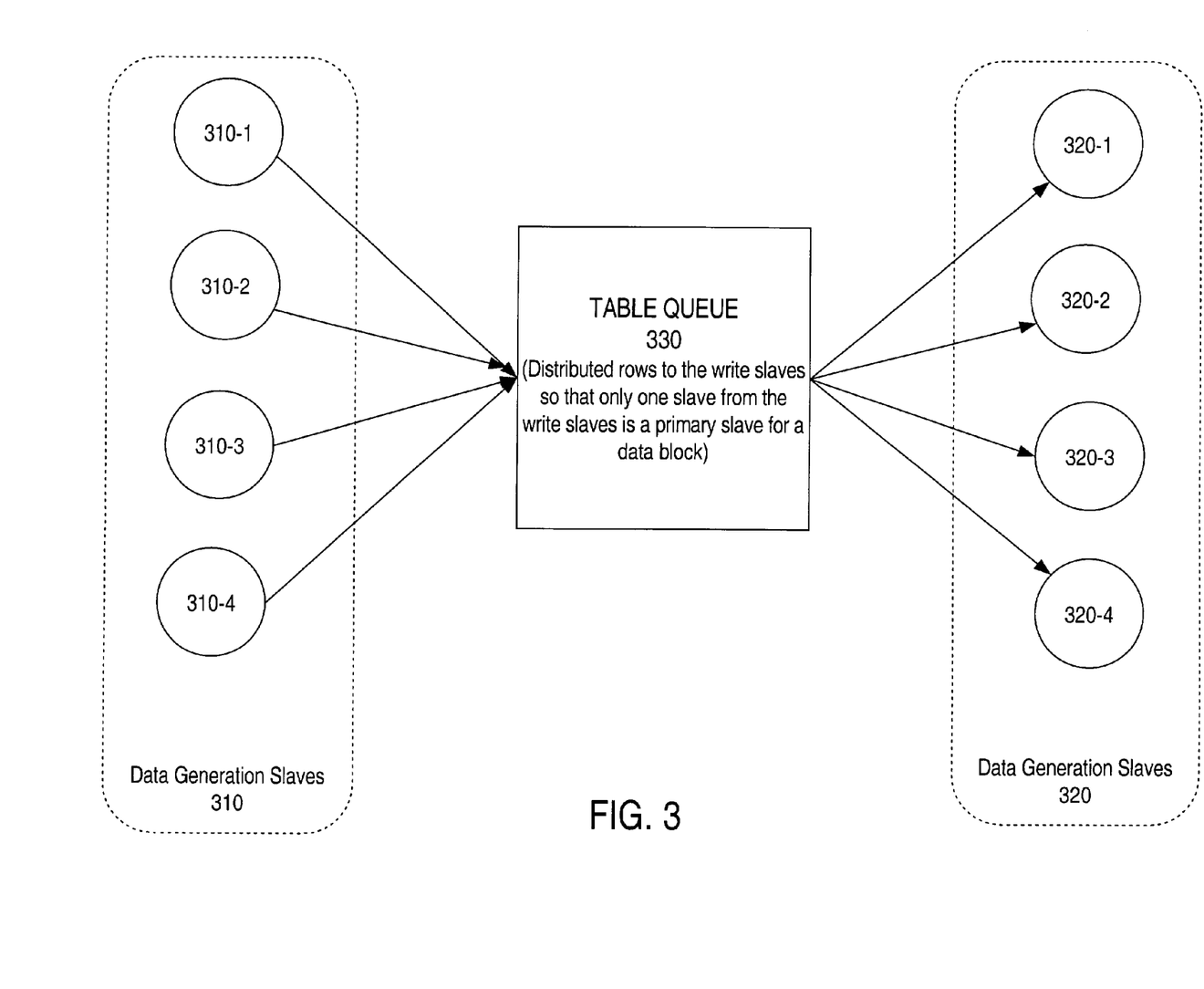
FIG. 3 is a block diagram depicting the distribution of data between slave processes according to an embodiment of the present invention.

To prevent self deadlocks, query coordinator 120 divides DML operations into subtasks and distributes them to groups of slaves, so that no more than one primary slave is assigned to change a data block. DML operations typically include processing that precede the actual step of changing data in a table. Specifically, the preliminary steps of creating, re-arranging, or collecting the data ("data generation" steps) may have to be performed before the data is written to a table. According to an embodiment, one or more sets of subtasks are created for performing the preliminary steps of data generation and assigned to a group of slaves ("data generation slaves"). The data generation slaves generate output rows which are then distributed to a second set of slaves ("write slaves") who change data blocks of a table based on the output rows. The output rows are distributed to the write slaves so that only one slave from the write slaves is a primary slave for a data block. FIG. 3 is a diagram showing how query coordinator 120 distributes rows to write slaves in this way.

Referring to FIG. 3, it shows data generation slaves 310. Data generation slaves 310 generate output rows to send to table queue 330. The output rows contain data from rows ("base rows") in a table. An output row may be veritable copy of a base row in a table, may contain part of base row's data, or even data from multiple base rows. An output row generated by a data generation slave includes a row-id of its base row. A write slave that processes an output row updates the output row's base row. As a DML operation affects one table, the write slaves that change data blocks for the DML operation change base rows in only one table.

A table queue, such as table queue 330, is a software component responsible for propagating and partitioning the dataflow generated by a set of slaves ("producers") to another set of slaves ("consumers"). A table queue consists of various components, including a distributor that assigns output rows generated by the producers to particular consumers, and a queuing and enqueing mechanism for storing rows assigned to a particular consumer until transmitted to the consumer.

Figure 4:
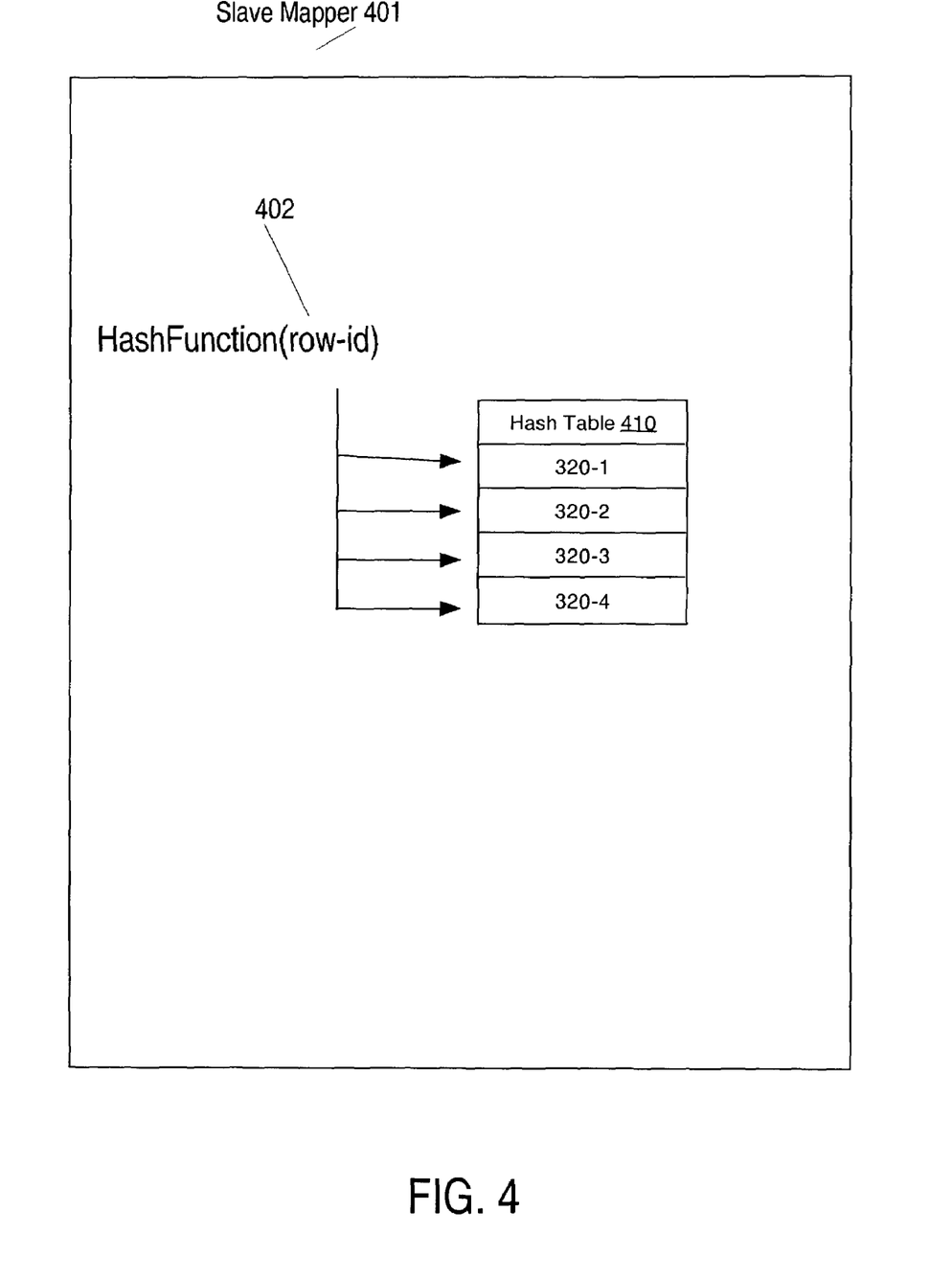
FIG. 4 is a block diagram of a components that are used to assign data to write slaves according to an embodiment of the present invention.

Table queue 330 ensures that all output rows whose base row belongs to the same primary data block are sent to the same slave. Specifically, table queue 330 includes a distributor, referred to herein as a slave mapper, that assigns rows whose base row is contained in the same primary data block to the same slave. FIG. 4 shows components of a slave mapper according to an embodiment of the present invention.

Referring to FIG. 4, its shows slave mapper 401. Slave mapper 401 includes hash function 402 and hash table 410. Preferably, entries in hash table 410 have a one-to-one correspondence with write slaves 320. Each entry corresponds to one and only one write slave in write slaves 320, and contains data that identifies the corresponding write slave. Each write slave corresponds to one and only one entry in hash table 410. Hash function 402 receives a row-id and generates a hash value that corresponds to an entry in hash table 410. As mentioned before, a row-id identifies a data block to which a row belongs. Hash function 402 generates that same value for row-ids that identify the same data block. To assign a row to a particular slave, table queue 330 invokes hash function 402 to generate a hash value, examines the entry in hash table 410 corresponding to the hash value, and assigns the row to the slave identified by the corresponding entry. The rows assigned to a write slave are sent to the write slave for processing.

The distribution of hash values generated by hash function 402 is uniform for a set of rows. As a result, the rows are distributed uniformly to write slaves 320, which creates a uniform load. In general, the efficiency of parallel processing is improved if load is balanced among the slaves.

As shown above, the process of distributing rows to the write slaves depends on a row-id. During execution of a distributed DML operation that inserts rows, the row-ids for the rows to insert are not available or do not exist at the time the rows are distributed to the write-slaves. Thus, techniques that depend on row-ids for distributing rows to write slaves described herein may not be applied to distributed DML operations that only insert rows. (Note: The techniques may nevertheless be applied to DML operations that perform an upsert operation.)

In an alternate embodiment, slave mapper 401 is implemented as a mapping function that returns an integer corresponding to one of write slaves 320. The mapping function is implemented by dividing a hash value by the number of slaves, producing an integer remainder. The remainder corresponds to one of write slaves 320. The hash value may be generated by invoking a hash function that, like hash function 402, takes a row-id as an input parameter and generates a hash value, where the same hash value is generated for row-ids that identify the same data block. To assign a row to a particular slave, table queue 330 invokes the mapping function to generate an integer value that corresponds to a particular write slave of write slaves 320, and assigns the row to the write slave.

FIG. 3 shows one set of data generation slaves and one set of write slaves. However, the present invention is not so limited. For example, the following database statement QA would be executed using multiple sets of data generation slaves, each performing a particular type of operation on a particular row source (e.g. a table, rows generated by slaves)

Update
(Select c for t1, t2 where t1.pk=t2.fk
Set c='A'

One set of data generation slaves loads rows from table t1, and another set of data generation slaves loads rows from t2. The rows loaded by each set of data generation slaves are sent to another set of data generation slaves that joins the rows from both tables. The joined rows are then sent to a table queue, such as table queue 330, for distribution to a set of write slaves to update table t1.

For some distributed DML operations, it may be advantageous for a slave to perform data generation and data manipulation operations. For example, the following database statement QB may be executed by a set of slaves that both loads rows from a table and updates them.

Update
(Select c for t1, t2 where t1.pk=t2.fk
Set c='A'

The advantage of executing query QB in this way is that the overhead of distributing rows to another set of slaves is avoided. To ensure that only one primary slave is assigned to any one data block, slaves may be assigned a subset of rows to load, where the primary data block of a row in one subset can not be the primary data block of a row in another subset.

Free Lists

Figure 5:
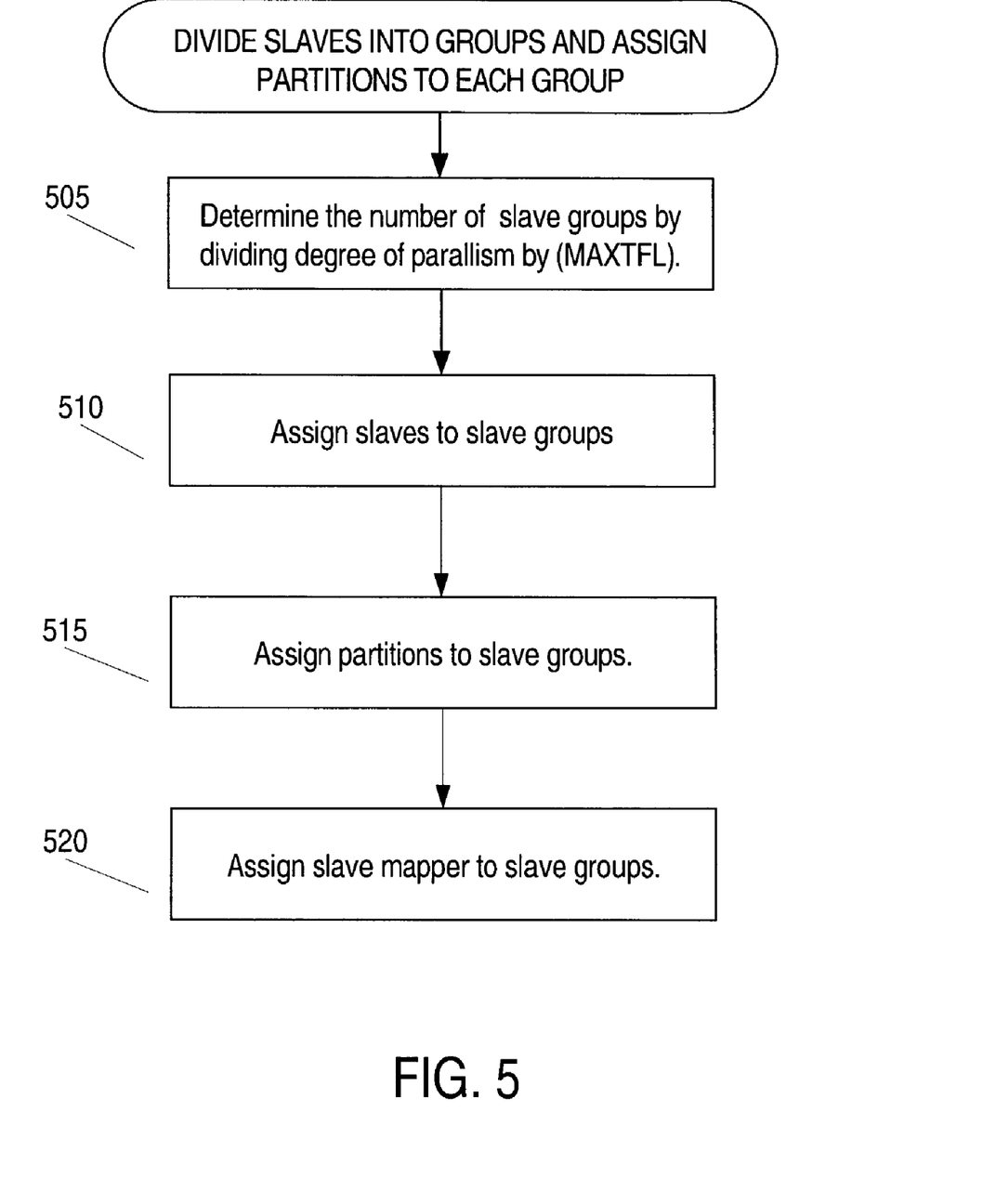
FIG. 5 is a flow chart depicting a process for distributing partitions to slaves modifying those partitions according to an embodiment of the present invention.
Figure 6:
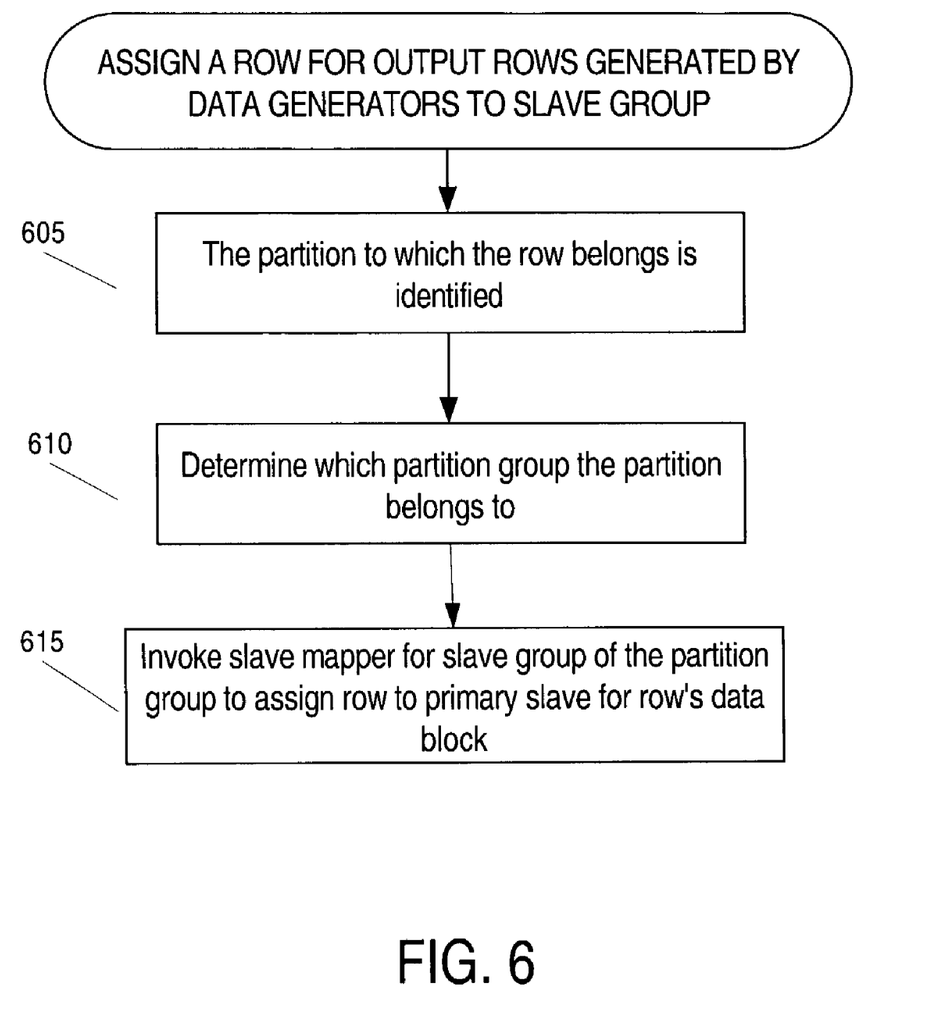
FIG. 6 is a flow chart depicting a process for distributing data from partitions to slaves that modify those partitions according to an embodiment of the present invention.

As mentioned before, contention for free lists can cause a distributed transaction to be executed less efficiently. FIGS. 5 and 6 are flow charts depicting processes for assigning and distributing rows generated by data generation slaves to a set of write slaves in a manner that reduces and eliminates contention for free lists by the write slaves, while also preventing self-deadlocks.

According to an embodiment of the present invention, a group of free lists ("free list group") is maintained for each partition, or, more specifically, for a storage segment that stores data for a partition. A storage segment, is a set of one or more sets of contiguous blocks, referred to as extents. Data for a non-partitioned table is stored in one segment, data for a partitioned table is stored in multiple segments, one segment per partition. A threshold number of free lists maintained for a segment is defined by database metadata and is user configurable. That threshold number is referred to herein as MAXTFL. Contention for free lists is reduced or eliminated by ensuring that the number of slaves that modify the rows in a single partition is no larger than MAXTFL.

FIG. 5 shows a process for dividing the set of write slaves into groups ("slave groups") containing no more than MAXTFL slaves. Each slave group performs data manipulation operations to a group of partitions ("partition group"). No more than one slave group performs operations to a partition group. As a result, no more than MAXTFL write slaves perform data manipulation operations to a single partition in a partition group and no more than MAXTFL write slaves contend for free lists in the free list group of the partition. The steps of FIG. 5 may be performed in the execution planning phase. For purposes of illustration, 50 writes slaves are being used to perform write operations on a set of four partitions.

Referring to FIG. 5, at step 505, the number of slave groups is determined by dividing the degree of parallism by MAXTFL. The degree of parallism is the number of slaves that are being used to perform data manipulation operations. In this example, the degree of parallism is 50 and MAXTFL is 25. Thus, the number of slave groups is 2 (50/25). The two slave groups are referred to as slave group A and slave group B. If the remainder is nonzero, then the quotient is rounded up to the next whole number.

At step 510, the slaves are assigned to slave groups such that each slave group has no more than MAXTFL slaves. Preferably, the slaves are assigned so that the number in each slave group is uniform. In the current example, the number of slave groups assigned to both slave group A and B is 25.

At step 515, the partitions are assigned to the slave groups, forming a partition group for each slave group. The partitions are assigned to partition groups, seriatim, in an order based on their partition size. The partition size is based on the number of rows in the partition. Database system 101 maintains statistics about the number of rows stored in particular partitions. For example, the largest of the four partitions is assigned to slave group A, the next largest to slave group B, the next largest to slave group A, and the smallest is assigned to slave group B. Assigning partitions in this way tends to balance the data that has to be processed by each group, and, consequently, the work load.

At step 520, a slave mapper, such as slave mapper 401, is assigned to each slave group.

FIG. 6 is a flow chart depicting the process of assigning output rows generated by data generation slaves to the slave groups, and to slaves within the slave group. The steps may be performed by a table queue while executing an execution plan, to distribute output rows to write slaves.

Referring to FIG. 6, at step 605, the partition to which the row belongs is identified. According to an embodiment of the present invention, this may be determined by examining the row-id of the row. The row-id includes information not only about the primary data block that contains the row, but the database object that contains the row. Types of database objects that can contain rows include tables and table partitions.

At step 610, the partition group to which the identified partition belongs is identified. At step 615, the slave mapper for the slave group corresponding to the partition group identified in step 610 is invoked, assigning a output row to one primary slave for the respective base rows' data block.

Slave Sharing

A slave group can complete their portion of a distributed DML operation before slave groups. If the other groups of slaves have less than MAXTFL members, as is often the case, one or more slaves from a slave group that has finished ("source slave group") can be assigned to a slave group that has not finished. The number of slaves reassigned in this way should not be so great as to cause the number of slaves in the other group to exceed MAXTFL.

For example, if the degree of parallism is 80 and MAXTFL is 25, then the number of slave groups is 4. Twenty slaves are assigned to each slave group. When one slave group finishes, up to five can be reassigned to another slave group that has not finished.

Preferably, a slave should not be reassigned to another slave group so that its work load is twice that of the workload it had in the source slave group. This reduces the probability that the shared slave is re-assigned so much work that it will not complete the work until other write slaves have completed theirs. Generally, efficiency of a set of slaves is improved if they complete their work at the same time.

The work load of a shared slave may be based on the average work load assigned to the slaves of a slave group. The average workload can be calculated by determining the total number of rows in the partition group, and dividing by that number by the number of slaves in the group.

Another way to balance work load is to not assign all partitions to partition groups during the execution planning phase, leaving some in reserve to be assigned "dynamically" once execution of a distributed DML operation is commenced. The partitions assigned to partition groups in the execution planning phase are referred to as being statically binded to their groups and the corresponding slave group. When a slave group completes the work for partition group, the slave group may be assigned partitions from the reserve.

Hardware Overview

Figure 7:
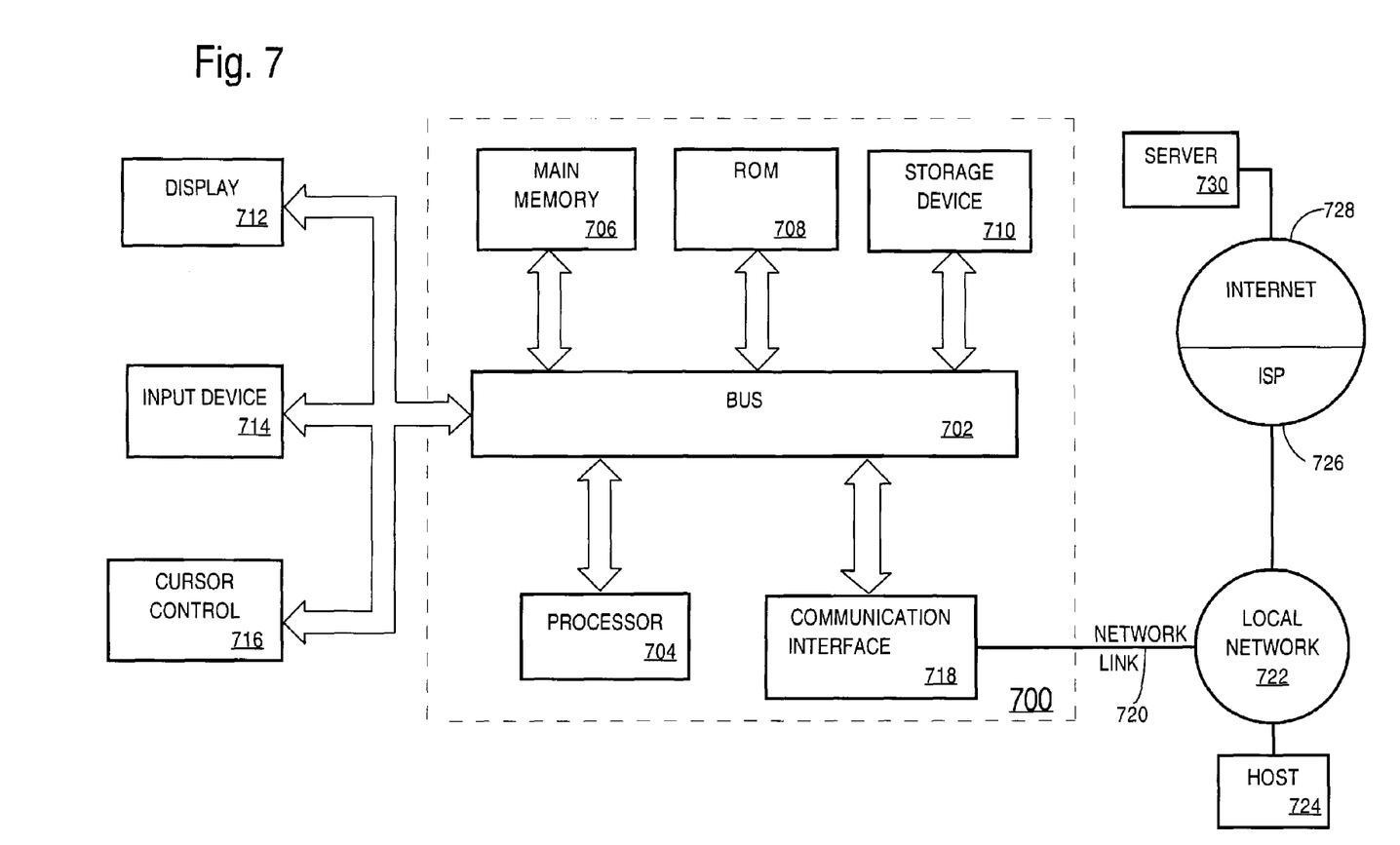
FIG. 7 is a block diagram of a computer system according to an embodiment of the present invention.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for performing DML database tasks in parallel using multiple processes. According to one embodiment of the invention, performing DML database tasks in parallel using multiple processes is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for performing DML database tasks in parallel using multiple processes as described herein.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. A method, the method comprising the computer-implemented steps of:
assigning a first plurality of slaves and a second plurality of slaves to participate in execution of a distributed operation, wherein the distributed operation involves accessing base rows that are contained in at least one table and that are stored in a plurality of data blocks;
wherein said first plurality of slaves generates output rows for processing by said second plurality of slaves;
wherein said generated output rows contain data from said accessed base rows;
generating a data structure that indicates associations of said second plurality of slaves with said plurality of data blocks;
distributing said generated output rows to said second plurality of slaves based on;
particular data blocks that contain the accessed base rows of the generated output rows; and
the associations of said second plurality of slaves with said plurality of data blocks;
wherein a first slave of said first plurality of slaves produces a first output row having a first base row from a certain data block of said plurality of data blocks;
wherein a second slave of said first plurality of slaves produces a second output row having a second base row from said certain data block of said plurality of data blocks; and
wherein distributing said output rows includes:
assigning, based on the generated data structure and said certain data block containing said first base row, said first output row to a certain slave of said second plurality of slaves that is associated with said certain data block; and
assigning, based on the generated data structure and said certain data block containing said second base row, said second output row to said certain slave of said second plurality of slaves that is associated with said certain data block.

2. The method of claim 1, wherein:
each base row contained in said certain data block is associated with a row-id containing data identifying said certain data block; and
the step of assigning said first output row includes assigning said first output row to said certain slave based on the row-id associated with the first base row of said first output row.

3. The method of claim 1, wherein:
the first output row is associated with a first row-id and the second output row is associated with a second row-id, wherein said first row-id and said second row-id contain data identifying said certain data block;
the generated data structure comprises a hash table that includes entries, wherein each entry in said hash table is associated with a hash value from a set of hash values and a slave from said second plurality of slaves; and
wherein the step of assigning includes:
applying a hash function to the data identifying said certain data block from the first row-id to generate a particular hash value,
applying said hash function to the data identifying said certain data block from the second row-id to generate said particular hash value,
assigning said first output row to said certain slave associated with the entry in said hash table associated with the particular hash value, and
assigning said second output row to said certain slave associated with the entry in said hash table associated with the particular hash value.

4. The method of claim 1, wherein the steps further include another slave from said second plurality of slaves modifying a data in said certain data block, wherein said association does not associate said another slave with the certain data block.

5. The method of claim 4, wherein said another slave is assigned a particular row to modify that is stored in another data block other than said certain data block.

6. The method of claim 5, wherein said particular row is comprised of a row piece stored in said certain data block and said another data block.

7. The method of claim 1, wherein:
said distributed operation is a distributed transaction involving DML operations,
wherein said distributed transaction includes subtransactions for each slave of said second plurality of slaves; and
the steps further include committing said distributed transaction and each subtransaction of said subtransactions.

8. The method of claim 7, wherein:
said distributed transaction is executed by a database system;
the steps further include said database system limiting the quantity of uncommitted transactions that concurrently modify data in said certain data block to a threshold number; and
the number of slaves in said second plurality of slaves is greater than said threshold number.

9. The method of claim 8, wherein:
said at least one table is comprised of one or more table partitions;
said certain data block stores rows that belong to a partition; and
the steps further include assigning a subset of said second plurality of slaves to modify data in said partition, wherein the number of slaves in said subset is greater than said threshold number.

10. The method of claim 8, wherein:
said certain data block contains a plurality of locks, wherein the number of locks in said plurality of locks is said threshold number; and
the steps further include said database system causing a process executing a transaction that includes modifications to at least a portion of a row stored in the certain data block to acquire a lock from said plurality of locks for the transaction.

11. A computer-readable storage medium storing one or more sequences of instructions for executing distributed operations, wherein execution of the one or more sequences of instructions by one or more processors causes the one or more processors to perform the steps of:

assigning a first plurality of slaves and a second plurality of slaves to participate in execution of a distributed operation, wherein the distributed operation involves accessing base rows that are contained in at least one table and that are stored in a plurality of data blocks;

wherein said first plurality of slaves generates output rows for processing by said second plurality of slaves;

wherein said generated output rows contain data from said base rows;

generating a data structure that indicates associations of said second plurality of slaves with said plurality of data blocks;

distributing said generated output rows to said second plurality of slaves based on;

particular data blocks that contain the accessed base rows of the generated output rows; and the associations of said second plurality of slaves with said plurality of data blocks;

wherein a first slave of said first plurality of slaves produces a first output row having a first base row from a certain data block of said plurality of data blocks;

wherein a second slave of said first plurality of slaves produces a second output row having a second base row from said certain data block of said plurality of data blocks; and wherein distributing said output rows includes:

assigning, based on the generated data structure and said certain data block containing said first base row, said first output row to a certain slave of said second plurality of slaves that is associated with said certain data block; and assigning, based on the generated data structure and said certain data block containing said second base row, said second output row to said certain slave of said second plurality of slaves that is associated with said certain data block.

12. The computer-readable storage medium of claim 11, wherein:

each base row contained in said certain data block is associated with a row-id containing data identifying said certain data block; and the step of assigning said first output row includes assigning said first output row to said certain slave based on the row-id associated with the first base row of said first output row.

13. The computer-readable storage medium of claim 11, wherein:

the first output row is associated with a first row-id and the second output row is associated with a second row-id, wherein said first row-id and said second row-id contain data identifying said certain data block;

the generated data structure comprises a hash table that includes entries, wherein each entry in said hash table is associated with a hash value from a set of hash values and a slave from said second plurality of slaves; and wherein the step of assigning includes:

applying a hash function to the data identifying said certain data block from the first row-id to generate a particular hash value, applying said hash function to the data identifying said certain data block from the second row-id to generate said particular hash value, assigning said first output row to said certain slave associated with the entry in said hash table associated with the particular hash value, and assigning said second output row to said certain slave associated with the entry in said hash table associated with the particular hash value.

14. The computer-readable storage medium of claim 11, wherein the steps further include another slave from said second plurality of slaves modifying a data in said certain data block, wherein said association does not associate said another slave with the certain data block.

15. The computer-readable storage medium of claim 14, wherein said another slave is assigned a particular row to modify that is stored in another data block other than said certain data block.

16. The computer-readable storage medium of claim 15, wherein said particular row is comprised of a row piece stored in said certain data block and said another data block.

17. The computer-readable storage medium of claim 11, wherein:

said distributed operation is a distributed transaction involving DML operations, wherein said distributed transaction includes subtransactions for each slave of said second plurality of slaves; and the steps further include committing said distributed transaction and each subtransaction of said subtransactions.

18. The computer-readable storage medium of claim 17, wherein:

said distributed transaction is executed by a database system;

the steps further include said database system limiting the quantity of uncommitted transactions that concurrently modify data in said certain data block to a threshold number; and the number of slaves in said second plurality of slaves is greater than said threshold number.

19. The computer-readable storage medium of claim 18, wherein:

said at least one table is comprised of one or more table partitions;

said certain data block stores rows that belong to a partition; and the steps further include assigning a subset of said second plurality of slaves to modify data in said partition, wherein the number of slaves in said subset is greater than said threshold number.

20. The computer-readable storage medium of claim 18, wherein:

said certain data block contains a plurality of locks, wherein the number of locks in said plurality of locks is said threshold number; and the steps further include said database system causing a process executing a transaction that includes modifications to at least a portion of a row stored in the certain data block to acquire a lock from said plurality of locks for the transaction.

* * * * *

UNITED STATES PATENT AND TRADEMARK OFFICE
CERTIFICATE OF CORRECTION

| | | |
|---|---|---|
| PATENT NO. | : 7,293,011 B1 | Page 1 of 1 |
| APPLICATION NO. | : 10/305744 | |
| DATED | : November 6, 2007 | |
| INVENTOR(S) | : Bedi et al. | |

It is certified that error appears in the above-identified patent and that said Letters Patent is hereby corrected as shown below:

In column 8, line 64, after "slaves)" insert -- . --.

In column 10, line 38, delete "a" and insert -- an --, therefor.

In column 13, line 31, in Claim 1, after "on" delete ";" and insert -- : --, therefor.

In column 15, line 16, in Claim 11, after "on" delete ";" and insert -- : --, therefor.

Signed and Sealed this

Twenty-first Day of October, 2008

JON W. DUDAS
*Director of the United States Patent and Trademark Office*